(12) United States Patent
Wittmaak et al.

(10) Patent No.: US 12,559,231 B2
(45) Date of Patent: Feb. 24, 2026

(54) TANDEM TILTROTOR AIRCRAFT

(71) Applicant: Textron Innovations Inc., Providence, RI (US)

(72) Inventors: John Robert Wittmaak, Newark, TX (US); Stephen Yibum Chung, Keller, TX (US); Matthew Edward Louis, Fort Worth, TX (US); Steven M. Loveland, Fort Worth, TX (US)

(73) Assignee: Textron Innovations, Inc., Providence, RI (US)

( * ) Notice: Subject to any disclaimer, the term of this patent is extended or adjusted under 35 U.S.C. 154(b) by 1102 days.

(21) Appl. No.: 16/249,325

(22) Filed: Jan. 16, 2019

(65) Prior Publication Data

US 2020/0223537 A1 Jul. 16, 2020

(51) Int. Cl.
| | |
|---|---|
| *B64C 27/52* | (2006.01) |
| *B64C 11/50* | (2006.01) |
| *B64C 27/37* | (2006.01) |
| *B64C 29/00* | (2006.01) |
| *B64U 30/297* | (2023.01) |
| *B64U 50/13* | (2023.01) |

(52) U.S. Cl.
CPC .............. *B64C 27/52* (2013.01); *B64C 11/50* (2013.01); *B64C 27/37* (2013.01); *B64U 30/297* (2023.01); *B64U 50/13* (2023.01); *B64C 29/0033* (2013.01)

(58) Field of Classification Search
CPC ......... B64C 27/22; B64C 27/37; B64C 27/52; B64C 11/46; B64C 29/0033; B64C 2201/088
See application file for complete search history.

(56) References Cited

U.S. PATENT DOCUMENTS

| | | | |
|---|---|---|---|
| 3,081,964 A | * | 3/1963 | Henry ................. B64C 29/0033 |
| | | | 244/54 |
| 5,709,357 A | | 1/1998 | Von Wilmowsky et al. |
| 7,922,115 B2 | | 4/2011 | Colgren et al. |

(Continued)

FOREIGN PATENT DOCUMENTS

| | | |
|---|---|---|
| CN | 105775117 A | 7/2016 |
| RU | 2507122 C1 | 2/2014 |
| WO | 2017153807 A1 | 9/2017 |

OTHER PUBLICATIONS

EP 20150282.2, European Search Report, 4 pages, May 25, 2020. European Patent Office ; Communication Pursuant to Article 94(3) EPC; Dec. 9, 2020; p. 1-4.

*Primary Examiner* — Marisa V Conlon
(74) *Attorney, Agent, or Firm* — Whitaker Chalk Swindle & Schwartz PLLC; Enrique Sanchez, Jr.; Juan Vasquez

(57) ABSTRACT

A tandem tiltrotor aircraft in which the tiltrotor assemblies are operably coupled at the forward and aft ends of the fuselage of the aircraft is disclosed. The tiltrotor assemblies are capable of rotating between a vertical lift position and a horizontal flight position. The in-line location of the tiltrotor assemblies allow the aircraft to have the vertical take-off and landing capabilities, and, in combination with the at least one wing, can be used in horizontal flight. The nacelles can be disposed on the fuselage they are coaxial in forward flight and do not add to the drag profile like wing-tip nacelles would. When wing-borne flight is desired some or all of the rotors can rotate down so the thrust vector is in a generally horizontal plane.

18 Claims, 11 Drawing Sheets

(56)     References Cited

U.S. PATENT DOCUMENTS

|  |  |  |  |  |
|---|---|---|---|---|
| 8,660,712 | B2 | 2/2014 | Grabowsky et al. | |
| 9,085,355 | B2 * | 7/2015 | DeLorean | B64C 39/04 |
| 9,623,967 | B2 | 4/2017 | Mallard | |
| 10,287,011 | B2 | 5/2019 | Wolff et al. | |
| 10,450,062 | B1 * | 10/2019 | Bova | B64C 5/06 |
| 10,518,873 | B2 * | 12/2019 | Netzer | B64C 29/0083 |
| 10,787,255 | B2 | 9/2020 | George | |
| 2018/0222580 | A1 * | 8/2018 | DeLorean | B64D 27/24 |
| 2018/0370629 | A1 | 12/2018 | Finlay et al. | |
| 2019/0061936 | A1 * | 2/2019 | North | B64C 29/0033 |
| 2021/0339860 | A1 | 11/2021 | Agostino et al. | |

* cited by examiner

200

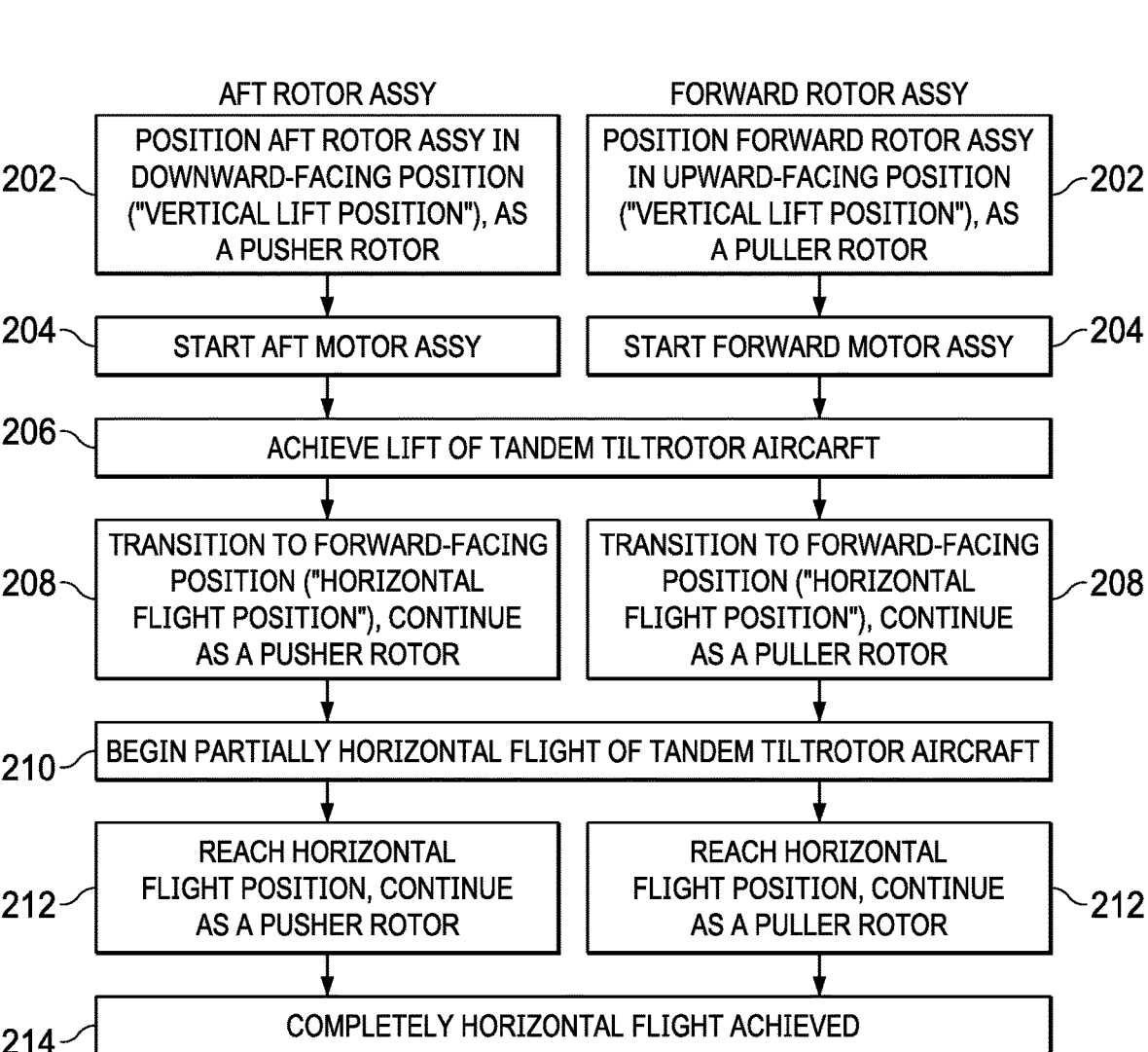

| AFT ROTOR ASSY | FORWARD ROTOR ASSY |
|---|---|
| 202 — POSITION AFT ROTOR ASSY IN DOWNWARD-FACING POSITION ("VERTICAL LIFT POSITION"), AS A PUSHER ROTOR | POSITION FORWARD ROTOR ASSY IN UPWARD-FACING POSITION ("VERTICAL LIFT POSITION"), AS A PULLER ROTOR — 202 |
| 204 — START AFT MOTOR ASSY | START FORWARD MOTOR ASSY — 204 |

206 — ACHIEVE LIFT OF TANDEM TILTROTOR AIRCARFT

| 208 — TRANSITION TO FORWARD-FACING POSITION ("HORIZONTAL FLIGHT POSITION"), CONTINUE AS A PUSHER ROTOR | TRANSITION TO FORWARD-FACING POSITION ("HORIZONTAL FLIGHT POSITION"), CONTINUE AS A PULLER ROTOR — 208 |

210 — BEGIN PARTIALLY HORIZONTAL FLIGHT OF TANDEM TILTROTOR AIRCRAFT

| 212 — REACH HORIZONTAL FLIGHT POSITION, CONTINUE AS A PUSHER ROTOR | REACH HORIZONTAL FLIGHT POSITION, CONTINUE AS A PULLER ROTOR — 212 |

214 — COMPLETELY HORIZONTAL FLIGHT ACHIEVED

TANDEM TILTROTOR AIRCRAFT

BACKGROUND

1. Field of the Invention:

The present invention is generally related tiltrotor aircraft, and specifically to tiltrotor aircraft in which the rotors of the aircraft are located at the aft and forward ends of the fuselage.

2. Background of the Invention and Description of Related Art

Like helicopters, traditional tiltrotor aircraft are utilized in situations in which completely vertical take-off and landing of the aircraft is desired. Once in the air, and as the aircraft starts to propel itself forward, the rotors of the aircraft tilt from a vertical to a horizontal position to better facilitate horizontal flight. Traditional tiltrotor aircraft incorporate the rotors into the wing tips of the aircraft. This requires the wing to carry the aircraft weight cantilevered at the far end of the wing. To facilitate this design, a considerable amount of structural support is required in the wings of the aircraft. Since the wing must be much stronger at its extremes than a normal airplane wing. Each rotor nacelle also adds to the aircraft's drag profile.

Traditional tiltrotor aircraft are incapable of incorporating the rotors into the fuselage of the aircraft due to space limitations associated with a tiltrotor system. Having a rotor at the front of the fuselage would not allow the aircraft to have a functional cockpit.

Tandem rotor aircraft are able to incorporate rotors to the fuselage of the aircraft since the rotors do not tilt and thus do not require the same amount of space as the rotors of tiltrotor aircraft. Like tiltrotor aircraft, tandem rotor aircraft are used in situations in which vertical take-off and landing is desired. However, because the rotors of tandem rotor aircraft are not able to tilt, the aircraft do not have the desirable horizontal flight properties of tiltrotor aircraft.

SUMMARY

A Tandem Tiltrotor (TTR) allows the wing to be optimized for aerodynamic performance without the limitations associated to carrying a nacelle at the wing tip (on ground) and conversely without carrying aircraft weight from the nacelles during hovers. Fuselages on most aircraft are typically very structural to begin with so moving the nacelles to the fuselage results in weight savings as well. With the nacelles disposed on the fuselage, they are coaxial in forward flight and do not add to the drag profile like wing-tip nacelles would. A rotor mounted near the front of the aircraft and another mounted near the rear provide lift for hovering. When wing-borne flight is desired some or all of the rotors can rotate downward so the thrust vector is in a horizontal plane. Several configurations are contemplated:

A. "Traditional"—Both rotors are above the aircraft and when rotated downward the forward rotor begins to pull the aircraft forward. The aft rotor can either feather its rotor or have negative pitch capability such that it can assist in forward flight, feather its rotor or fold the rotor all together.
B. "Daisy Cutter"—One rotor is above the aircraft (generally the forward one) and the other is below pushing upward in hover. As the forward rotor rotates downward it will pull the aircraft forward. As the lower rotor rotates upward it will begin to push the aircraft forward as well.

C. "Bottom"—Both rotors positioned below the aircraft. When the forward rotor rotates upward it can have negative pitch capability, feather its rotor, or fold all together. When the aft rotor is rotated upward it will push the aircraft forward. This configuration could be preferred when docking with another aircraft or inspecting the underside of something.

D. "Augmented CG" or "Higher Gross Weight"—A rotor may be left in the vertical lift orientation while the other rotor provides forward propulsion. This would allow the aircraft to have a higher gross weight, allow for safer transitions at slow airspeeds where the wing may stall or allow for wider range of CGs.

E. Other configurations exist. More than two rotors can be used in series for instance; the key element of this design is that they are in series. Any combination of feathered, folded, or negative pitch rotors can be used.

The current disclosure describes an aircraft in which the tiltrotors are located at the forward and aft ends of the fuselage of the aircraft, thus eliminating the need for extra support in the wings of the aircraft and making the aircraft more efficient in horizontal flight, while still allowing the aircraft to have the vertical take-off and landing abilities of a traditional tiltrotor aircraft. Although not limited to pilotless aircraft, at least one embodiment of this disclosure would work well in such aircraft, as the entire forward end of the aircraft fuselage can be used to accommodate the forward end rotor assemblies, and therefore continue to increase the efficiency of the aircraft.

Accordingly, one embodiment of the present disclosure includes a tiltrotor aircraft, comprising: a fuselage having a forward end and an aft end; a wing operably coupled to the fuselage; a forward rotor assembly having rotor blades can be operably coupled to the forward end of the fuselage, the forward rotor assembly can be operably rotatable between a vertical lift position and a horizontal flight position; and an aft rotor assembly having rotor blades can be operably coupled to the aft end of the fuselage, the aft rotor assembly can be operably rotatable between a vertical lift position and a horizontal flight position. The vertical lift position can dispose the rotor blades above the fuselage. The vertical lift position can dispose the rotor blades below the fuselage. The horizontal lift position of the forward rotor assembly can position the rotor blades forward of the forward end of the fuselage. The horizontal lift position of the aft rotor assembly can position the rotor blades aft of the aft end of the fuselage.

Several configurations exist, such that the forward rotor assembly can be rotatably positioned in the horizontal flight position and configured as a puller rotor; and the aft rotor assembly can be rotatably positioned in the horizontal flight position and configured as a pusher rotor. The forward rotor assembly can be rotatably positioned in the horizontal flight position and configured to be a puller rotor; and the aft rotor assembly can be rotatably positioned in the horizontal flight position and configured to be idle. The forward rotor assembly can be rotatably positioned in the horizontal flight position and configured to be idle; and the aft rotor assembly can be rotatably positioned in the horizontal flight position and configured as a pusher rotor. The forward rotor assembly can be rotatably positioned in the horizontal flight position and configured as a puller rotor; and the aft rotor assembly can be rotatably positioned in the vertical lift position and configured as a puller rotor. The forward rotor assembly can be rotatably positioned in the vertical lift position and configured as a pusher rotor; and the aft rotor assembly can be rotatably positioned in the horizontal flight position and configured as a pusher rotor. The forward rotor assembly can be rotatably positioned in the vertical lift position and configured as a puller rotor; and the aft rotor assembly can be rotatably positioned in the vertical lift position and configured as a pusher rotor. The forward rotor assembly can be rotatably positioned in the vertical lift position and configured as a puller rotor; and the aft rotor assembly is rotatably positioned in the vertical lift position and configured as a puller rotor. The forward rotor assembly can be rotatably positioned in the vertical lift position and configured as a pusher rotor; and the aft rotor assembly can be rotatably positioned in the vertical lift position and configured as a puller rotor. The propeller blades can optionally be folded parallel to the nacelle and subsequently locked.

In another embodiment of the disclosure, a method for transitioning the orientation of a rotor assembly of a tiltrotor aircraft, can include: rotating a forward rotor assembly having rotor blades and operably coupled to a forward end of a fuselage between a vertical lift position with the rotor blades positioned above the fuselage and a horizontal flight position with the rotor blades positioned forward of the fuselage; and rotating an aft rotor assembly having rotor blades and operably coupled to an aft end of a fuselage between a vertical lift position with the rotor blades positioned above or below the fuselage and a horizontal flight position with the rotor blades positioned aft of the fuselage.

Several configurations exist, such that the orientation of a rotor assembly transitions the flight direction of the tiltrotor aircraft from a vertical flight direction to a horizontal flight direction. The orientation of a rotor assembly transitions the flight direction of the tiltrotor aircraft from a horizontal flight direction to a vertical flight direction. The method can further include operating the forward rotor assembly as a puller rotor; and operating the aft rotor assembly as a pusher rotor. The method can also include operating the forward rotor assembly as a puller rotor; and operating the aft rotor assembly as a puller rotor while the aft rotor assembly is positioned in the vertical lift position, and operating the aft rotor assembly as a pusher rotor while the aft rotor assembly is positioned in the horizontal flight position. As well as: operating the forward rotor assembly as a pusher rotor while the forward rotor assembly is positioned in the vertical lift position, and operating the forward rotor assembly as a puller rotor while the forward rotor assembly in the horizontal flight position; and operating the aft rotor assembly as a pusher rotor.

BRIEF DESCRIPTION OF THE DRAWINGS

FIG. 4 is a flowchart describing the transition of a tandem tiltrotor aircraft arranged in a daisy cutter configuration to forward flight, in accordance with an embodiment of the present disclosure;

DETAILED DESCRIPTION

The preferred version of the invention presented in the following written description and the various features and advantageous details thereof are explained more fully with reference to the non-limiting examples included in the accompanying drawings and as detailed in the description which follows. Descriptions of well-known components and are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

Figure 1:
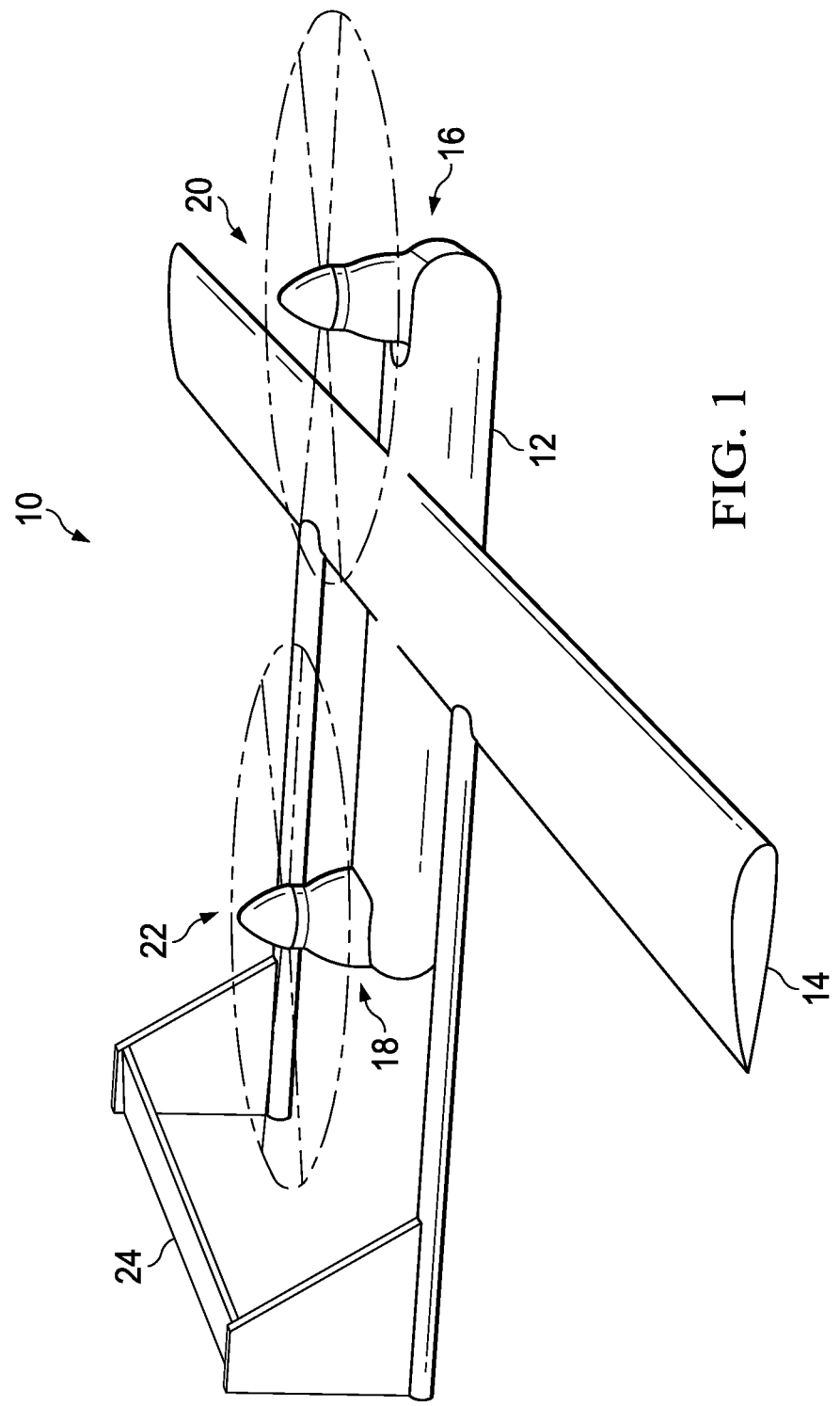
FIG. 1 is a perspective view of a tandem tiltrotor aircraft arranged in a traditional configuration, in accordance with an embodiment of the present disclosure.

FIG. 1 is a perspective view of tandem tiltrotor aircraft, designated generally as 10, in accordance with an embodiment of the present disclosure. The tandem tiltrotor aircraft 10 includes a fuselage 12, a forward rotor assembly 16, an aft rotor assembly 18, a wing 14, and a horizontal stabilizer 24. The fuselage 12 can be an elongated member such that it extends from an aft end to a forward end, along a fuselage axis. The aircraft 10, is preferably an Unmanned Aerial Vehicle (UAV), but can be manned. The forward rotor assembly 16 can be operably coupled to the forward end of the fuselage 12, along the fuselage axis. Then aft rotor assembly 18 can be operably coupled to the aft end of the fuselage, along the fuselage axis. The wing 14 can be configured to provide lift for sustained horizontal flight and can be operably coupled to the fuselage at a point between the aft end and forward end of the fuselage 12.

Both the forward rotor assembly 16 and the aft rotor assembly 18 are configured to be rotatably positioned between a vertical lift position and a horizontal flight positon. In a preferred embodiment, each rotor assembly 16 or 18 can be configured to rotate in-line with the fuselage axis, or orthogonal to the fuselage axis. The vertical lift position for each rotor assembly 16 or 18 being a position in which the rotor assembly can be aligned substantially vertically, and the horizontal flight position for each rotor assembly being a position in which the rotor faces substantially horizontally. The forward rotor assemblies 16 and 18 are aligned substantially vertically if they can lift the fuselage from the ground, independently or in concert. The rotor assemblies 16 and 18 are aligned substantially horizontally, if they can move the fuselage horizontally along the fuselage axis, independently or in concert. Each rotor assembly 16 or 18 can be configured to be operable for propulsion as they rotate between the lift and horizontal flight positions. Further, each rotor assembly 16 or 18 can be configured to stop at any selected location along its rotation between the lift and flight positions and continue propulsion operation at that selected location.

The rotor assemblies 16, 18 are not limited to any specific design. The embodiments disclose any type of rotor assembly used or potentially used in the propulsion of aircraft. In one embodiment, the rotors assemblies 16 and 18 can be propeller type rotors, the forward rotor assembly 16 comprising a plurality of propeller blades 20, the aft rotor assembly 18 comprising a plurality of propeller blades 22.

In one embodiment of the disclosure, the aircraft 10 can be configured for vertical lift. The vertical lift position for the forward rotor assembly 16 can be configured such that the forward rotor assembly can be aligned substantially vertically (in an upward-facing vertical position). The vertical lift position for the aft rotor assembly 18 can be configured such that the aft rotor assembly can be aligned in an upward-facing vertical position (substantially vertically). This embodiment can be referred to as a "traditional" configuration. As discussed above, the rotor assemblies 16 or 18 can be any type of rotor assembly suitable for the propulsion of aircraft. In one embodiment, the rotor assemblies 16 and 18 can be propeller type rotors, the plurality of propeller blades 20 and 22 can be configured to have a positive pitch angle, such that as the rotor assemblies 16 or 18 provide thrust for aircraft 10 propulsion, the plurality of propeller blades 20 and 22 operate to "pull" aircraft 10 off of the ground substantially vertically, into the air. Rotor assemblies that work to "pull" aircraft are commonly referred to as "puller rotors," as the rotation of the propeller blades create a thrust away from a payload.

Figure 2:
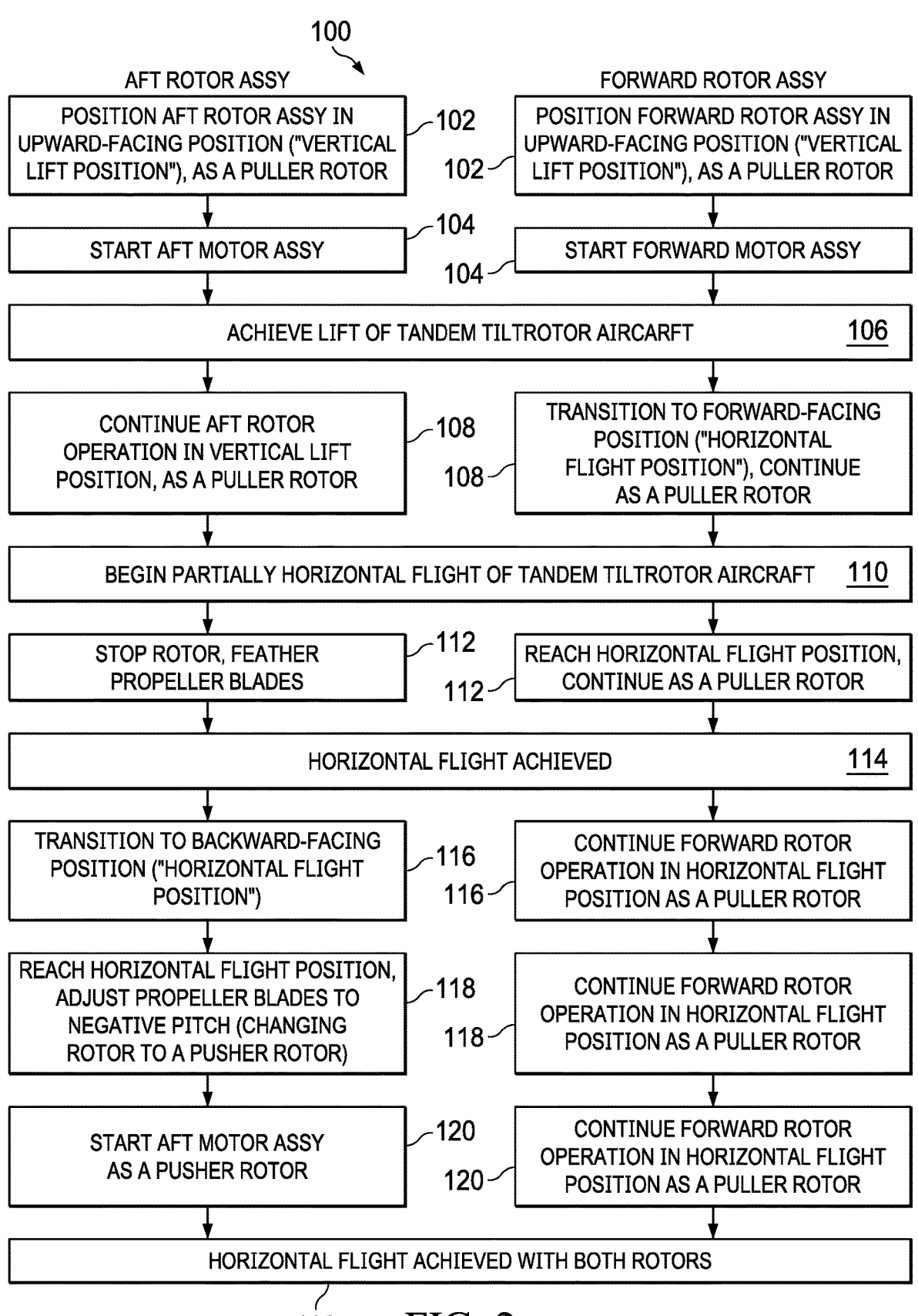
FIG. 2 is a flowchart describing the transition of a tandem tiltrotor aircraft arranged in a traditional configuration to forward flight, in accordance with an embodiment of the present disclosure.
Figure 7A:
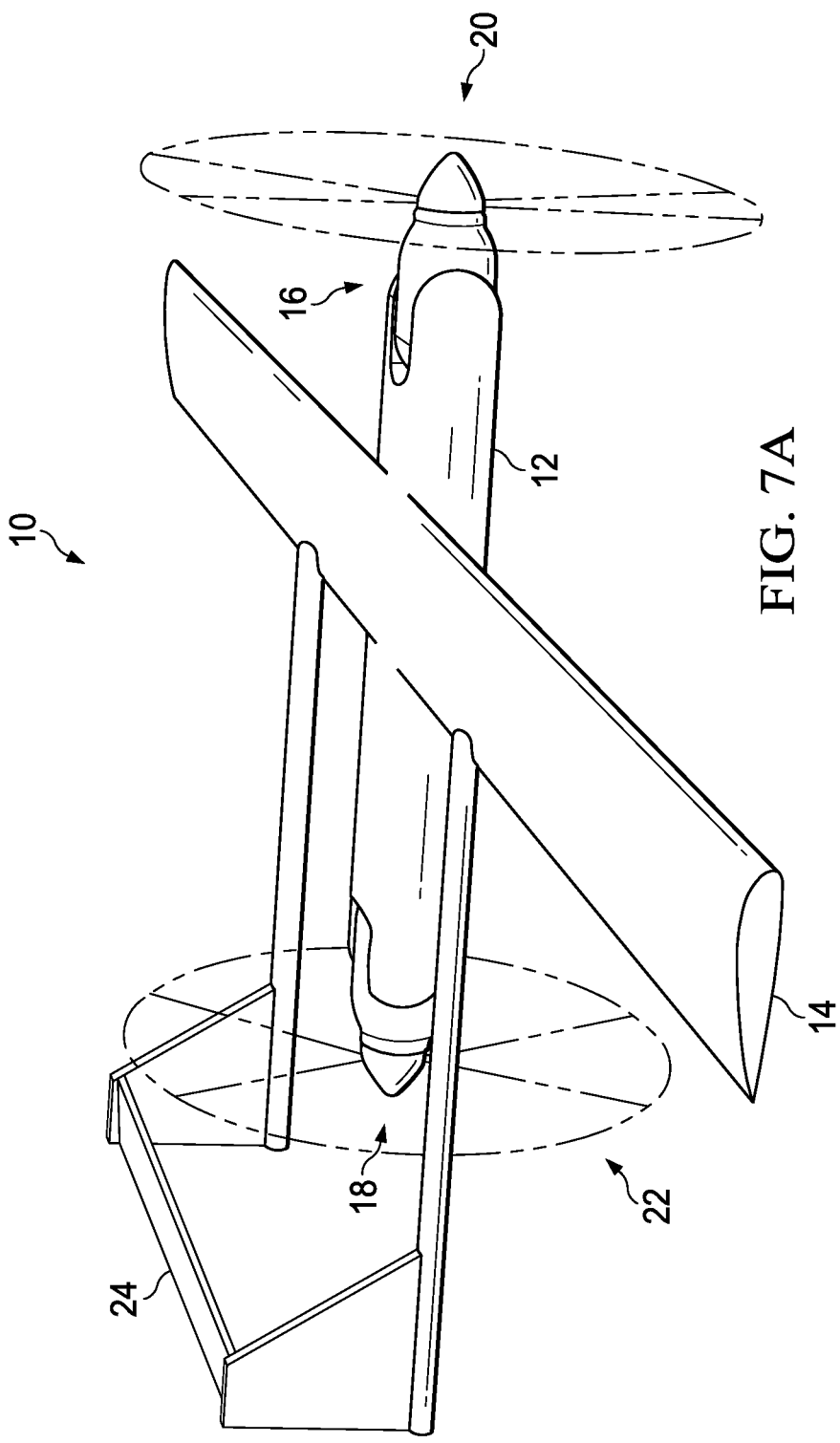
FIG. 7A is a perspective view of a tandem tiltrotor aircraft arranged in a dual rotor horizontal flight configuration, in accordance with an embodiment of the present disclosure.

FIG. 2 is a flowchart of a method 100 for transitioning the aircraft 10 from a traditional configuration disclosed in FIG. 1 to a dual-rotor horizontal flight configuration disclosed in FIG. 7A. The FIG. 2 flowchart describes the steps taken by the aft rotor assembly 18 on the left side of the flowchart, and the forward rotor assembly 16 on the right side of the flowchart. Each step can be executed by the rotor assemblies 16 and 18 simultaneously, sequentially, suitable delay, or other suitable initiation. The method begins at 102, where the aft rotor assembly 18 can be in a vertical lift position, which can be an upward-facing vertical position, the aft rotor assembly can be configured to be a puller rotor. At 102 the forward rotor assembly 16 can be in a vertical lift position, which can be an upward-facing vertical position, the forward rotor assembly can be configured to be a puller rotor. The method then proceeds to 104.

At 104, both rotor assemblies 16, 18 can be configured to begin propulsion operation. The method then proceeds to 106.

At 106, the aircraft 10 can achieve vertical lift due to the propulsion operation of the rotor assemblies 16, 18 in their respective vertical lift positions. The method then proceeds to 108.

At 108, the aft rotor assembly 18 can continue propulsion operation in a vertical lift position as a puller rotor. The forward rotor assembly 16 can begin to rotate to its horizontal flight position, which can be a substantially horizontal (forward-facing) position, and continue propulsion operation as a puller rotor. The method then proceeds to 110.

At 110, the aircraft 10 begins to travel in the horizontal direction, due to the forward rotor assembly 16 beginning to rotate to its horizontal flight position. The method then proceeds to 112.

At 112, the forward rotor assembly 16 reaches its horizontal flight position, and continues propulsion operation as a puller rotor. At this point, with the forward rotor assembly 16 in its horizontal flight position working as a puller rotor and the aft rotor assembly 18 in its vertical lift position working in as a puller rotor, the aft augmented lift horizontal flight configuration of FIG. 7D is achieved. At step 112, the aft rotor assembly 18 is further configured to stop propulsion operation, therefore becoming idle. The propeller blades 20 can optionally be folded parallel to the nacelle and subsequently locked. In one embodiment the aft rotor assembly 18 can be a propeller type rotor, the plurality of propeller blades 22 of the rotor assembly configured to adjust to a feathered pitch angle, so as to reduce the amount of drag produced by the propeller blades. The method then proceeds to 114.

At 114, the aircraft 10 achieves horizontal flight, the only vertical lift of the aircraft being produced by the aircraft wings 14. The method then proceeds to 116.

At 116, the aft rotor assembly 18, in an idle state, begins to rotate to its horizontal flight position, which is a backward-facing position. The forward rotor assembly 16 continues propulsion operation as a puller rotor. The method then proceeds to 118.

At 118, the aft rotor assembly 18 reaches its horizontal flight position. At this point, with the aft rotor assembly 18 in an idle state in its horizontal flight position and the forward rotor assembly working as a puller rotor in its horizontal flight position, the aircraft 10 has achieved the forward rotor horizontal flight configuration disclosed in FIG. 7B. The aft rotor assembly 18 can be further configured to operate as a as a pusher rotor. In one embodiment the aft rotor assembly 18 is a propeller type rotor, the plurality of propeller blades 22 of the rotor assembly can be configured to have a negative pitch angle, making the aft rotor assembly a pusher rotor. At 118, the forward rotor assembly 16 continues propulsion operation as a puller rotor. The method then proceeds to 120.

At 120, the aft rotor assembly 18 begins propulsion operation as a pusher rotor. The forward rotor assembly 16 continues propulsion operation as a puller rotor. The method then proceeds to 122.

At 122, the aircraft 10 achieves horizontal flight with both rotors 16, 18 providing propulsion in their respective horizontal flight positions, as disclosed in FIG. 7A.

It will be understood by those skilled in the art that the rotor assemblies 16, 18 are configured to transition back to their respective vertical lift positions disclosed in FIG. 1 from their respective horizontal flight positions in a process opposite of the process disclosed in the relevant preceding paragraphs and FIG. 2.

Figure 3:
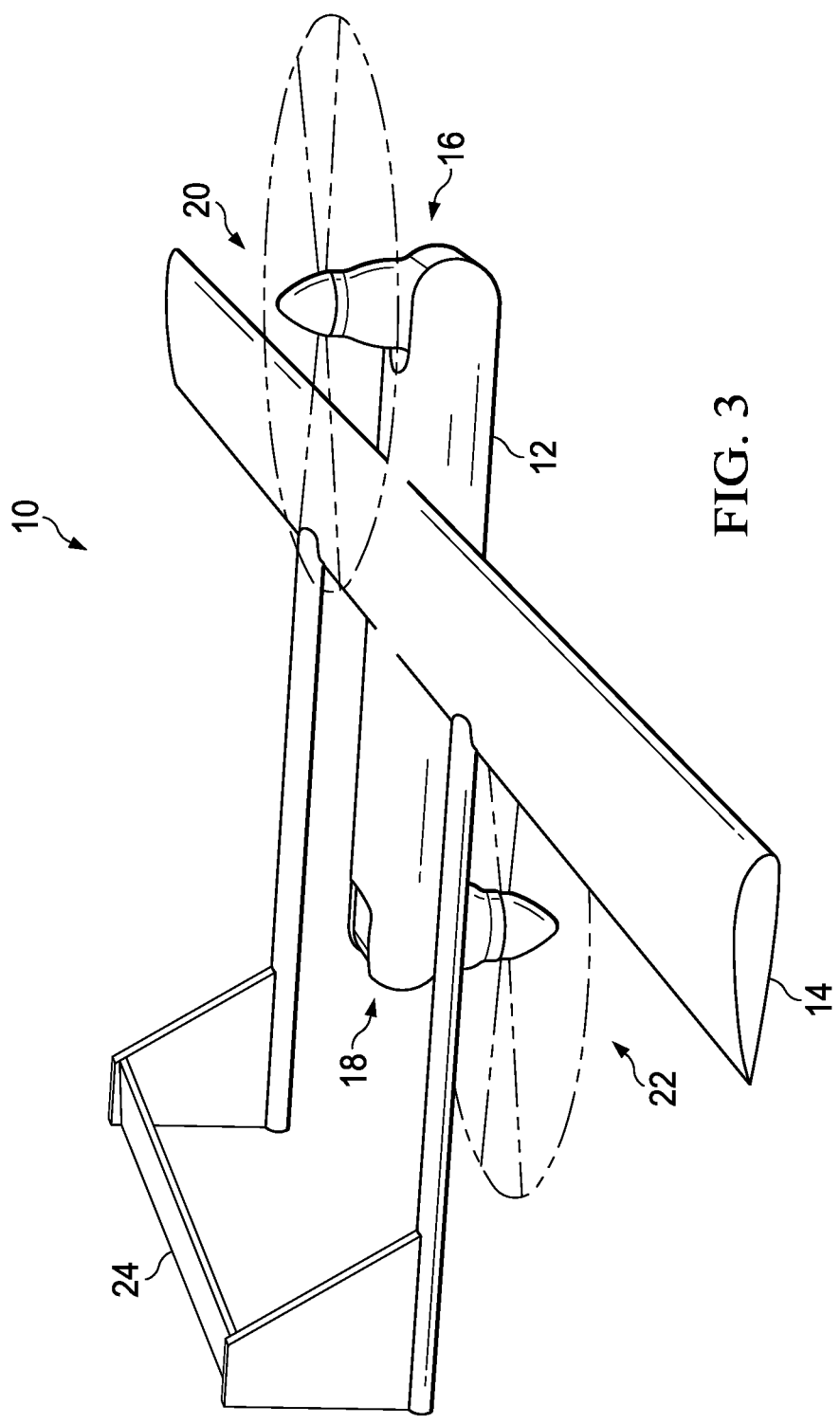
FIG. 3 is a perspective view of a tandem tiltrotor aircraft arranged in a daisy cutter configuration, in accordance with an embodiment of the present disclosure.

Referring to FIG. 3, in one embodiment of this disclosure, the aircraft 10 is configured for vertical lift. The vertical lift position for the forward rotor assembly 16 is configured such that the forward rotor assembly is in an upward-facing vertical position. The vertical lift position for the aft rotor 18 assembly is configured such that the aft rotor assembly is in a downward-facing vertical position. This embodiment is referred to as a "daisy cutter" configuration. As previously disclosed, the rotor assemblies 16, 18 can be any type of rotor assembly used or potentially used in the propulsion of aircraft. In one embodiment, the rotor assemblies 16, 18 are propeller type rotors, the plurality of propeller blades 20 of the forward rotor assembly 16 configured to have a positive pitch angle, such that as the forward rotor assembly spins in propulsion operation, the plurality of propeller blades work to "pull" aircraft 10 off of the ground vertically into the air. Rotor assemblies that work to "pull" aircraft are commonly referred to as "puller rotors." The plurality of propeller blades 22 of the aft rotor assembly 18 are configured to have negative pitch angles, such that as the aft rotor assembly spins in propulsion operation, the plurality of propeller blades work to "push" the aircraft 10 off of the ground vertically into the air. Rotor assemblies that work to "push" aircraft are commonly referred to as "pusher rotors," as the rotation of the propeller blades create a thrust toward a payload.

FIG. 4 is a flowchart of a method 200 for transitioning the aircraft 10 from a daisy cutter configuration disclosed in FIG. 3 to a dual rotor horizontal flight configuration disclosed in FIG. 7A. The FIG. 4 flowchart describes the steps taken by the aft rotor assembly 18 on the left side of the flowchart, and the forward rotor assembly 16 on the right side of the flowchart. Each step can be executed by the rotor assemblies 16 and 18 simultaneously, sequentially, suitable delay, or other suitable initiation. The method begins at 202, where the aft rotor assembly 18 is in its vertical lift position, which is a downward-facing position, the aft rotor assembly configured to be a pusher rotor. At 202 the forward rotor assembly 16 is in its vertical lift position, which is an upward-facing position, the forward rotor assembly configured to be a puller rotor. The method then proceeds to 204.

At 204, both rotor assemblies 16, 18 are configured to begin propulsion operation. The method then proceeds to 206.

At 206, the aircraft 10 achieves vertical lift due to the propulsion operation of the rotor assemblies 16, 18 in their respective vertical lift positions. The method then proceeds to 208.

At 208, the aft rotor assembly 18 begins to rotate to its horizontal flight position, which is a backward-facing position, and continues propulsion operation as a pusher rotor. The forward rotor assembly 16 begins to rotate to its horizontal flight position, which can be a substantially horizontal (forward-facing) position, and continues propulsion operation as a puller rotor. The method then proceeds to 210.

At 210, the aircraft 10 begins to travel in the horizontal direction, due to the rotor assemblies 16, 18 beginning to rotate to their respective horizontal flight position. The method then proceeds to 212.

At 212, the aft rotor assembly 18 reaches its horizontal flight position, and continues propulsion operation as a pusher rotor. The forward rotor assembly 16 reaches its horizontal flight position, and continues propulsion operation as a puller rotor. The method then proceeds to 214.

At 214, the aircraft 10 achieves horizontal flight with both rotors 16, 18 providing propulsion in their respective horizontal flight positions, as disclosed in FIG. 7A.

It will be understood by those skilled in the art that the rotor assemblies 16, 18 are configured to transition back to their respective vertical lift positions disclosed in FIG. 3 from their respective horizontal flight positions in a process opposite of the process disclosed in the relevant preceding paragraphs and FIG. 4.

Figure 5:
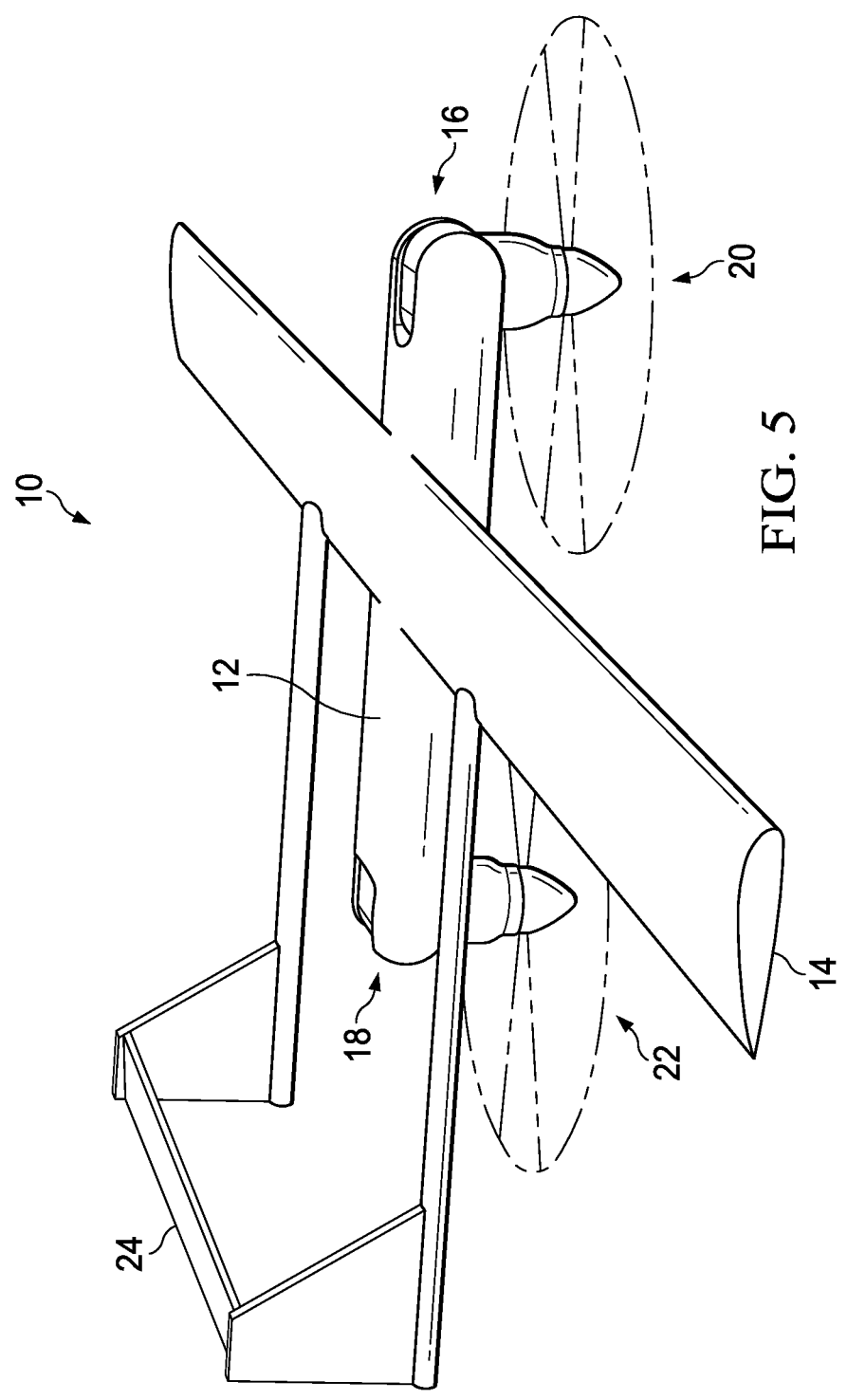
FIG. 5 is a perspective view of a tandem tiltrotor aircraft arranged in a bottom configuration, in accordance with an embodiment of the present disclosure.

Referring to FIG. 5, in one embodiment of this disclosure, the aircraft 10 is configured for vertical lift. The vertical lift position for the forward rotor assembly 16 is configured such that the forward rotor assembly is in a downward-facing vertical position. The vertical lift position for the aft rotor assembly 18 can be configured such that the aft rotor assembly is in a downward-facing vertical position. This embodiment can be referred to as a "bottom" configuration. As previously disclosed, the rotor assemblies 16, 18 can be any type of rotor assembly used or potentially used in the propulsion of aircraft. In one embodiment, the rotor assemblies 16, 18 are propeller type rotors, the plurality of propeller blades 20, 22 of each of the rotor assemblies configured to have a negative pitch angle, such that as the rotor assemblies 16, 18 spin in propulsion operation, the plurality of propeller blades 20, 22 work to "push" aircraft 10 off of the ground vertically into the air. Rotor assemblies that work to "push" the aircraft are commonly referred to as "pusher rotors."

Figure 6:
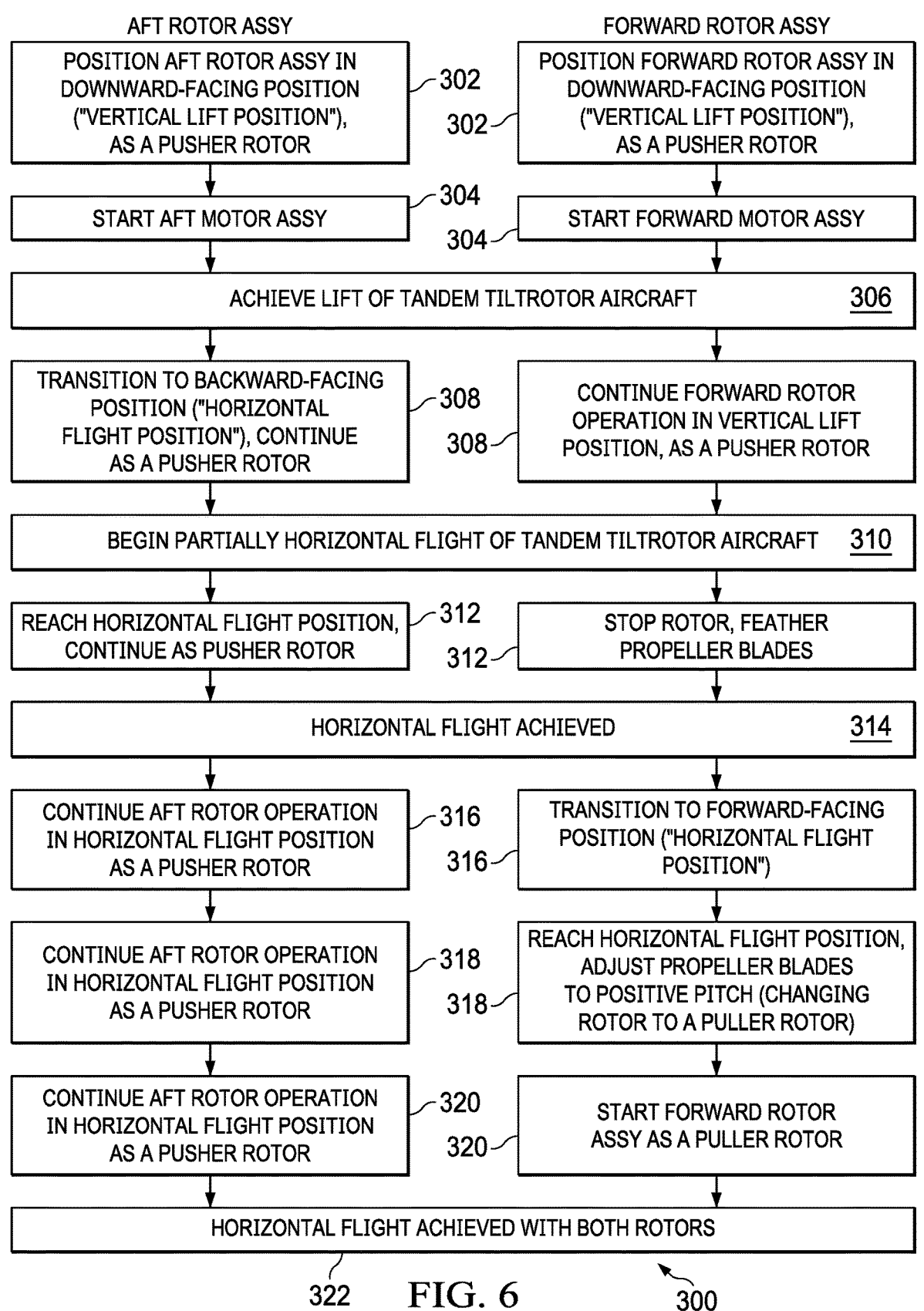
FIG. 6 is a flowchart describing the transition of a tandem tiltrotor aircraft arranged in a bottom configuration to forward flight, in accordance with an embodiment of the present disclosure.

FIG. 6 is a flowchart of a method 300 for transitioning the aircraft 10 from a "bottom" configuration disclosed in FIG. 1 to a dual rotor horizontal flight configuration disclosed in FIG. 7A. The FIG. 6 flowchart describes the steps taken by the aft rotor assembly 18 on the left side of the flowchart, and the forward rotor assembly 16 on the right side of the flowchart. Each step can be executed by the rotor assemblies 16 and 18 simultaneously, sequentially, suitable delay, or other suitable initiation. The method begins at 302, where the aft rotor assembly 18 is in its vertical lift position, which is a downward-facing position, the aft rotor assembly configured to be a pusher rotor. At 302 the forward rotor assembly 16 is in its vertical lift position, which can be a downward-facing position, the forward rotor assembly configured to be a pusher rotor. The method then proceeds to 304.

At 304, both rotor assemblies 16, 18 are configured to begin propulsion operation. The method then proceeds to 306.

At 306, the aircraft 10 achieves vertical lift due to the propulsion operation of the rotor assemblies 16, 18 in their respective vertical lift positions. The method then proceeds to 308.

At 308, the forward rotor assembly 16 continues propulsion operation in its vertical lift position as a pusher rotor. The aft rotor assembly 18 begins to rotate to its horizontal flight position, which is a backward-facing position, and continues propulsion operation as a pusher rotor. The method then proceeds to 310.

At 310, the aircraft 10 begins to travel in the horizontal direction, due to the aft rotor assembly 18 beginning to rotate to its horizontal flight position. The method then proceeds to 312.

At 312, the aft rotor assembly 18 reaches its horizontal flight position, and continues propulsion operation as a pusher rotor. At this point, with the forward rotor assembly 16 in its vertical lift position working as a pusher rotor and the aft rotor assembly 18 in its horizontal flight position working in as a pusher rotor, the forward augmented lift horizontal flight configuration of FIG. 7E is achieved. At 312, the forward rotor assembly 16 can be further configured to stop propulsion operation, therefore becoming idle. In one embodiment the forward rotor assembly 16 is a propeller type rotor, the plurality of propeller blades 20 of the rotor assembly configured to adjust to a feathered pitch angle, so as to reduce the amount of drag produced by the propeller blades. The propeller blades 20 can optionally be folded parallel to the nacelle and subsequently locked. The method then proceeds to 314.

At 314, the aircraft 10 achieves horizontal flight, the only vertical lift of the aircraft being produced by the aircraft wings 14. The method then proceeds to 316.

At 316, the forward rotor assembly 16, in an idle state, begins to rotate to its horizontal flight position, which can be a substantially horizontal (forward-facing) position. The aft rotor assembly 18 continues propulsion operation as a pusher rotor. The method then proceeds to 318.

At 318, the forward rotor assembly 16 reaches its horizontal flight position. At this point, with the forward rotor assembly 16 in an idle state in its horizontal flight position, and the aft rotor assembly working as a pusher rotor in its horizontal flight position, the aircraft 10 has achieved the aft rotor horizontal flight configuration disclosed in FIG. 7C. The forward rotor assembly 16 is further configured to operate as a as a puller rotor. In one embodiment, the forward rotor assembly 16 is a propeller type rotor, the plurality of propeller blades 20 of the rotor assembly configured to adjust to have a positive pitch angle, making the forward rotor assembly a puller rotor. At 318, the aft rotor assembly 18 continues propulsion operation as a pusher rotor. The method then proceeds to 320.

At 320, the forward rotor assembly 16 begins propulsion operation as a puller rotor. The aft rotor assembly 18 continues propulsion operation as a pusher rotor. The method then proceeds to 322.

At 322, the aircraft 10 achieves horizontal flight with both rotors 16, 18 providing propulsion in their respective horizontal flight positions, as disclosed in FIG. 7A.

It will be understood by those skilled in the art that the rotor assemblies 16, 18 are configured to transition back to their respective lift positions disclosed in FIG. 5 from their respective horizontal flight positions in a process opposite of the process disclosed in the relevant preceding paragraphs and FIG. 6.

All of the previously disclosed embodiments have described an aircraft 10 configured to rotate forward and aft rotor assemblies 16, 18 between a vertical lift and a horizontal flight position, the vertical lift and horizontal flight positions generally being approximately ninety degrees apart. However, it is understood that the disclosure is not limited to rotor assemblies 16, 18 rotatable only to approximately ninety degrees. There are contemplated embodiments of this disclosure in which the rotor assemblies 16, 18 are rotatable up to approximately 180 degrees. In these embodiments, the rotor assemblies 16, 18 can be configured to start and stop operation according to the desired results of the aircraft 10, in accordance with the prior disclosure. In these embodiments, the plurality of propeller blades 20, 22 of their respective rotor assemblies 16, 18, are configured to adjust their pitch direction according to the desired result of the aircraft 10, in accordance with the prior disclosure.

Figure 7B:
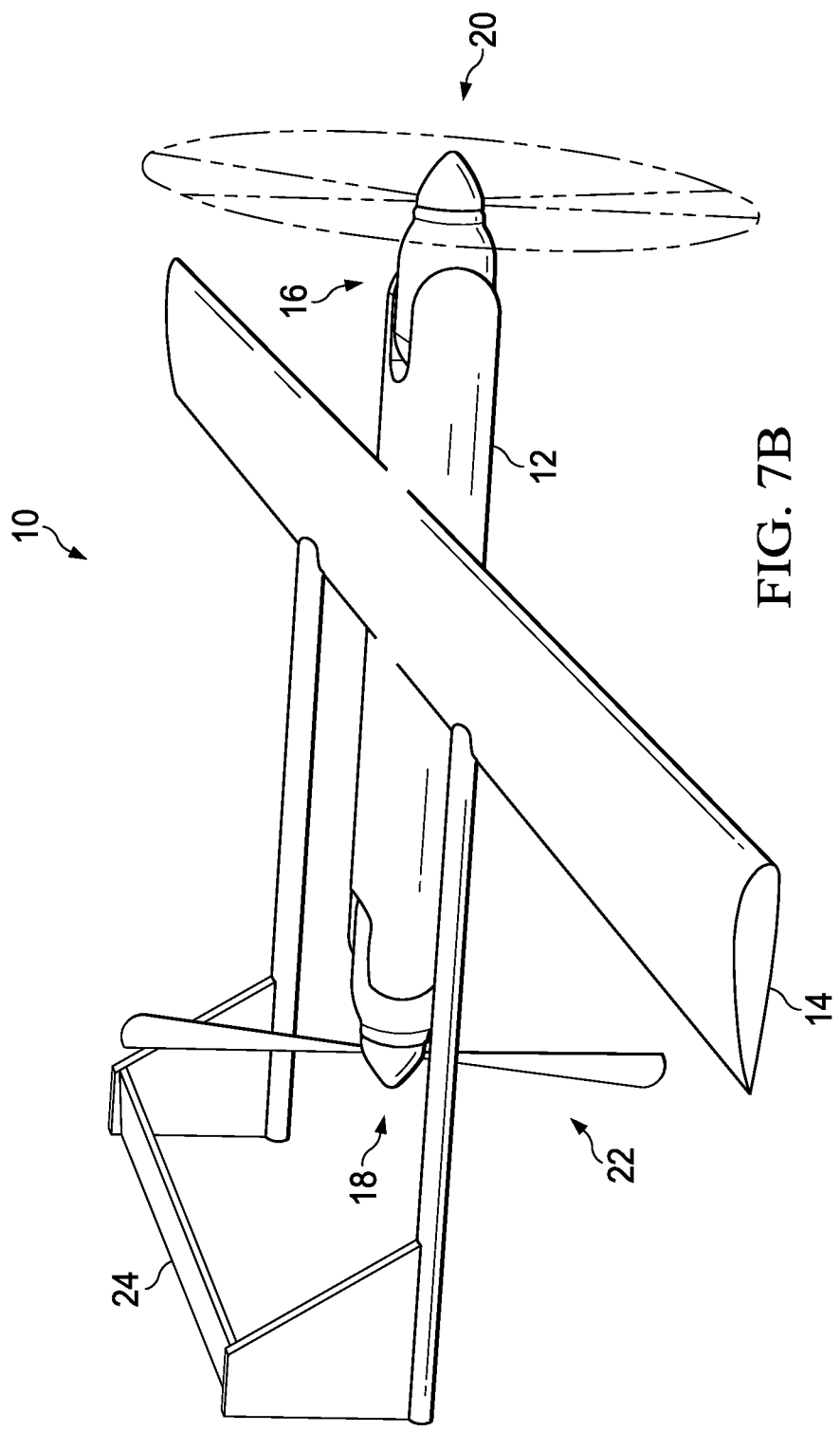
FIG. 7B is a perspective view of a tandem tiltrotor aircraft arranged in a forward rotor horizontal flight configuration, in accordance with an embodiment of the present disclosure.
Figure 7C:
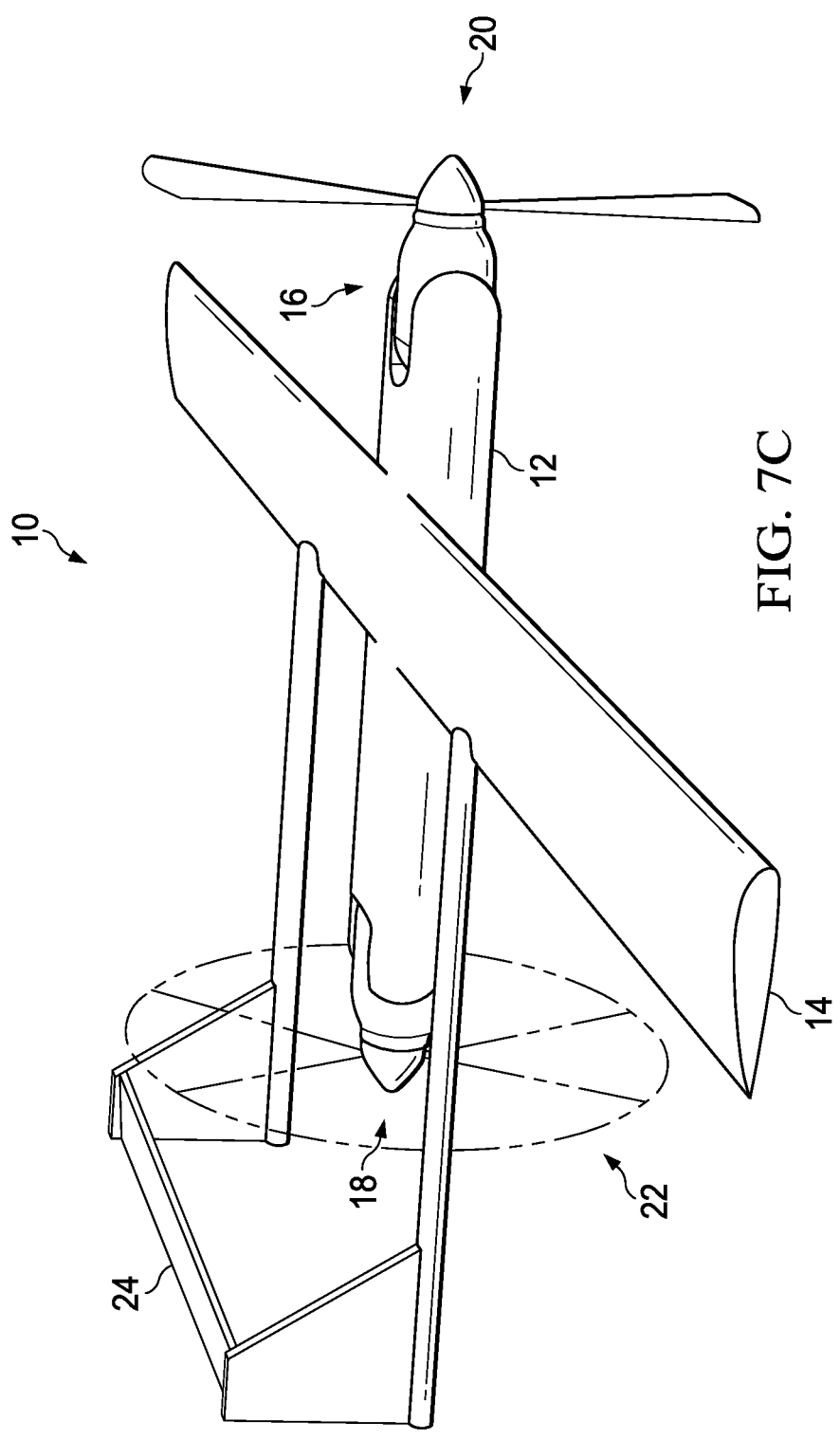
FIG. 7C is a perspective view of a tandem tiltrotor aircraft arranged in an aft rotor horizontal flight configuration, in accordance with an embodiment of the present disclosure.
Figure 7D:
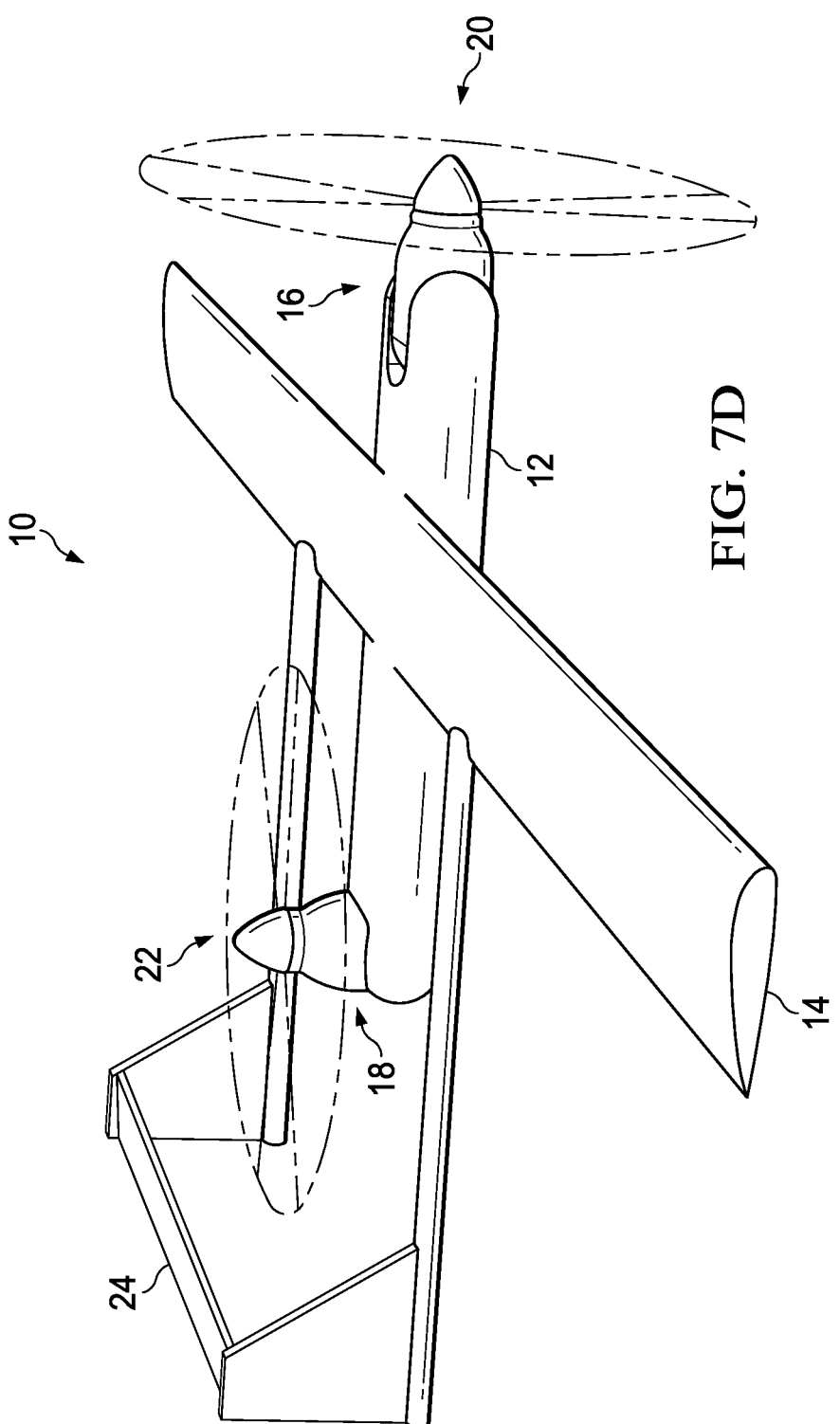
FIG. 7D is a perspective view of a tandem tiltrotor aircraft arranged in an aft augmented lift horizontal flight configuration, in accordance with an embodiment of the present disclosure.
Figure 7E:
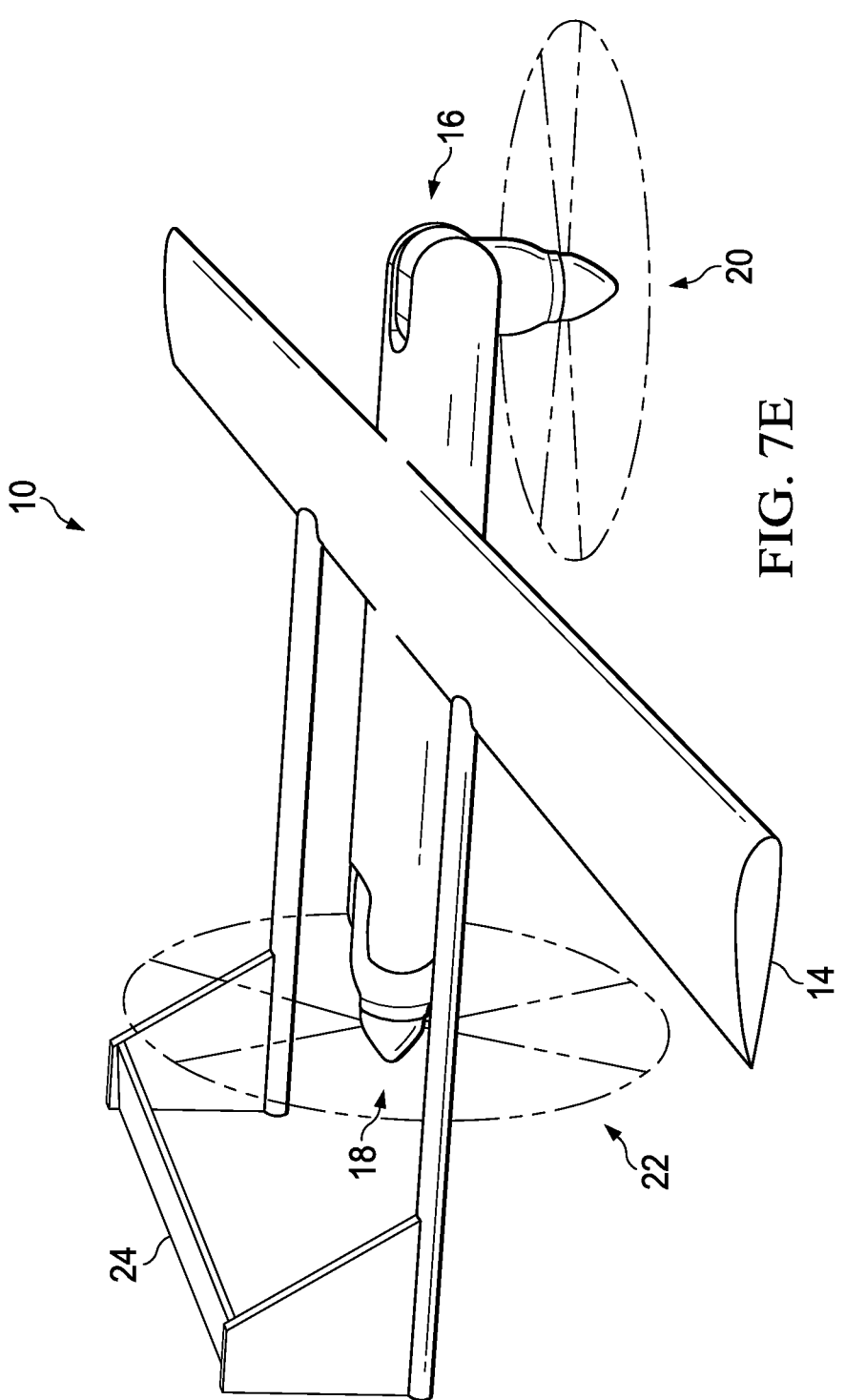
FIG. 7E is a perspective view of a tandem tiltrotor aircraft arranged in an augmented lift horizontal flight configuration, in accordance with an embodiment of the present disclosure.

FIGS. 7A-7E disclose perspective views of a tandem tiltrotor aircraft arranged various flight configurations, in accordance with various embodiments of the present disclosure. FIG. 7A is a perspective view of a tandem tiltrotor aircraft arranged in a dual rotor horizontal flight configuration, in accordance with an embodiment of the present disclosure. FIG. 7B is a perspective view of a tandem tiltrotor aircraft arranged in a forward rotor horizontal flight configuration, in accordance with an embodiment of the present disclosure. FIG. 7C is a perspective view of a tandem tiltrotor aircraft arranged in an aft rotor horizontal flight configuration, in accordance with an embodiment of the present disclosure. FIG. 7D is a perspective view of a tandem tiltrotor aircraft arranged in an aft augmented lift horizontal flight configuration, in accordance with an embodiment of the present disclosure. FIG. 7E is a perspective view of a tandem tiltrotor aircraft arranged in an augmented lift horizontal flight configuration, in accordance with an embodiment of the present disclosure.

The present invention achieves at least the following advantages:

1. Tandem tilt rotor allows VTOL capabilities with a large efficient rotor;
2. Improved CG envelope in helicopter mode and thus better airplane mode placement;
3. Fuselage nacelles that provide better load paths and a lighter wing, as well as easier drive system routing;
4. Multiple in-flight configurations allow aircraft flexibility to satisfy mission needs;
5. Can fly off rotors to higher speeds with rotor-borne flight through stall region; and
6. Better CG envelope as helicopter mode CG can be compensated with differential thrust allowing for better airplane mode CG placement.

While the disclosure has described a number of embodiments, it is not thus limited and is susceptible to various changes and modifications without departing from the spirit thereof. Persons skilled in the art will understand that this concept is susceptible to various changes and modifications, and may be implemented or adapted readily to other types of environments. For example, different rotor diameters for the forward and aft rotor assemblies, orthogonal rotor assemblies, full cyclic or only lateral, and variable RPM vs. collective at small scale are all within the scope of the present disclosure. Further, the individual elements of the claims are not well-understood, routine, or conventional. Instead, the claims are directed to the unconventional inventive concept described in the specification.

What is claimed is:

1. A tiltrotor aircraft, comprising:
an elongated member having a forward end and an aft end, wherein the elongated member maintains a substantially continuous width between the forward end and the aft end without tapering into a narrower width;
a wing operably coupled to the elongated member at a point between the forward end and the aft end;
a forward rotor assembly having forward rotor blades and operably coupled to the forward end of the elongated member, the forward rotor assembly operably rotatable between a vertical lift position and a horizontal flight position; and
an aft rotor assembly having aft rotor blades and operably coupled to the aft end of the elongated member, the aft rotor assembly configured in a vertical lift position,
wherein the forward rotor assembly and the aft rotor assembly are positioned along a same axis of the elongated member,
wherein, during vertical lift, both the forward rotor assembly and the aft rotor assembly are configured in the vertical lift position with propulsion operation, and
wherein, during horizontal flight, the forward rotor assembly is configured in the horizontal flight position with propulsion operation and the aft rotor assembly is configured in the vertical lift position with no propulsion operation and the aft rotor blades locked parallel to the elongated member.

2. The tiltrotor aircraft of claim 1, wherein the vertical lift position disposes the rotor blades of the forward or after rotor assembly above the elongated member.

3. The tiltrotor aircraft of claim 1, wherein the rotor assemblies can feather, fold, or negative pitch the rotor blades.

4. The tiltrotor aircraft of claim 1, wherein the horizontal flight position of the forward rotor assembly positions the forward rotor blades forward of the forward end of the elongated member.

5. The tiltrotor aircraft of claim 1, wherein the elongated member is a fuselage.

6. The tiltrotor aircraft of claim 5, wherein the axis of the elongated member is a fuselage axis.

7. The tiltrotor aircraft of claim 1, wherein the aft rotor assembly is further configured to stop propulsion operation.

8. The tiltrotor aircraft of claim 1, wherein:

the forward rotor assembly is configured as a puller rotor; and the aft rotor blades are feathered.

9. The tiltrotor aircraft of claim 1, wherein the rotor assemblies are configured as puller rotors or pusher rotors.

10. The tiltrotor aircraft of claim 9, wherein the rotor assemblies configured as puller rotors have rotor blades configured with a positive pitch angle.

11. The tiltrotor aircraft of claim 9, wherein the rotor assemblies configured as pusher rotors have rotor blades configured with a negative pitch angle.

12. A method for transitioning a tiltrotor aircraft from vertical lift to horizontal flight, comprising:

operating a forward rotor assembly having forward rotor blades and operably coupled to a forward end of an elongated member in a vertical lift position with the forward rotor blades positioned above the elongated member, wherein the elongated member maintains a substantially continuous width between the forward end and the aft end without tapering into a narrower width;

rotating the forward rotor assembly between the vertical lift position and a horizontal flight position with the forward rotor blades positioned forward of the elongated member; and operating an aft rotor assembly having aft rotor blades and operably coupled to an aft end of the elongated member in a vertical lift position with the rotor blades positioned above the elongated member wherein the forward rotor assembly and the aft rotor assembly are positioned along a same axis of the elongated member, wherein, during vertical lift, both the forward rotor assembly and the aft rotor assembly are configured in the vertical lift position with propulsion operation, and wherein, during horizontal flight, the forward rotor assembly is configured in the horizontal flight position with propulsion operation and the aft rotor assembly is configured in the vertical lift position with no propulsion operation and the aft rotor blades locked parallel to the elongated member.

13. The method of claim 12, wherein the orientation of the forward rotor assembly transitions a flight direction of the tiltrotor aircraft from a vertical flight direction to a horizontal flight direction.

14. The method of claim 12, wherein the orientation of the forward rotor assembly transitions a flight direction of the tiltrotor aircraft from a horizontal flight direction to a vertical flight direction.

15. The method of claim 12, wherein the aft rotor assembly is configured to be idle during horizontal flight.

16. The method of claim 15, wherein the aft rotor blades are feathered when the aft rotor assembly is idle during horizontal flight.

17. The method of claim 15, wherein an idle configuration stops the propulsion operation of the aft rotor assembly.

18. The method of claim 15, wherein the aft rotor blades are folded when the aft rotor assembly is idle during horizontal flight.

* * * * *